United States Patent
Tang et al.

(10) Patent No.: US 10,675,551 B2
(45) Date of Patent: Jun. 9, 2020

(54) REMOTE CONTROLLER AND HANDLE STRUCTURE THEREOF, AND METHOD FOR CONTROLLING A UAV

(71) Applicant: SZ DJI TECHNOLOGY CO., LTD., Shenzhen (CN)

(72) Inventors: Yin Tang, Shenzhen (CN); Tao Zhao, Shenzhen (CN); Lei Deng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 444 days.

(21) Appl. No.: 15/464,493

(22) Filed: Mar. 21, 2017

(65) Prior Publication Data
US 2017/0189823 A1    Jul. 6, 2017

Related U.S. Application Data

(63) Continuation of application No. PCT/CN2014/087325, filed on Sep. 24, 2014.

(51) Int. Cl.
| | |
|---|---|
| A63H 30/04 | (2006.01) |
| F16B 7/04 | (2006.01) |
| F16H 19/04 | (2006.01) |
| F16H 19/06 | (2006.01) |
| F16B 7/14 | (2006.01) |
| B64C 39/02 | (2006.01) |

(52) U.S. Cl.
CPC ............... *A63H 30/04* (2013.01); *F16B 7/04* (2013.01); *F16H 19/04* (2013.01); *F16H 19/06* (2013.01); *B64C 39/024* (2013.01); *B64C 2201/146* (2013.01); *F16B 7/14* (2013.01)

(58) Field of Classification Search
CPC ......... A63F 13/24; A63F 13/06; A63H 30/04; A63H 30/00; B64C 39/024; B64C 2201/146; F16B 7/14
See application file for complete search history.

(56) References Cited

U.S. PATENT DOCUMENTS

| | | | |
|---|---|---|---|
| 5,375,831 A | * | 12/1994 | Hsien-Chung .......... A63F 13/08 273/148 B |
| 5,785,317 A | | 7/1998 | Sasaki |

(Continued)

FOREIGN PATENT DOCUMENTS

| | | |
|---|---|---|
| CN | 87212906 U | 3/1988 |
| CN | 101698127 A | 4/2010 |

(Continued)

OTHER PUBLICATIONS

The World Intellectual Property Organization (WIPO) International Search Report for PCT/CN2014/087325 dated Apr. 28, 2015 8 Pages.

*Primary Examiner* — Patrick Cicchino
(74) *Attorney, Agent, or Firm* — Anova Law Group, PLLC

(57) ABSTRACT

A handle structure comprises a left body including a left docking portion, a right body including a right docking portion configured to be docked with the left docking portion, and a connecting mechanism connecting the left docking portion and the right docking portion and configured to allow the left docking portion and the right docking portion to slide relatively to adjust an interval between an end of the left body and an end of the right body that are distal from each other.

20 Claims, 8 Drawing Sheets

(56) References Cited

U.S. PATENT DOCUMENTS

| | | | |
|---|---|---|---|
| 6,371,829 B1 | 4/2002 | Kato et al. | |
| 8,905,845 B2* | 12/2014 | Willis | G06F 1/1632 361/679.01 |
| D729,803 S * | 5/2015 | Avery | D14/401 |
| 9,101,838 B2* | 8/2015 | Dascher | A63F 13/24 |
| 10,284,693 B2* | 5/2019 | Deng | H04M 1/04 |
| 2007/0178966 A1* | 8/2007 | Pohlman | A63F 13/06 463/36 |
| 2013/0154542 A1 | 6/2013 | Joynes et al. | |
| 2014/0190737 A1* | 7/2014 | Chen | G07C 9/00944 174/535 |
| 2014/0274394 A1* | 9/2014 | Willis | G06F 1/1632 463/37 |

FOREIGN PATENT DOCUMENTS

| | | |
|---|---|---|
| CN | 201732313 U | 2/2011 |
| CN | 202262659 U | 6/2012 |
| CN | 202694151 U | 1/2013 |
| CN | 103623593 A | 3/2014 |
| CN | 104043245 A | 9/2014 |
| CN | 203838864 U | 9/2014 |
| CN | 204217238 U | 3/2015 |
| EP | 0840641 B1 | 3/1999 |
| JP | S57126296 U | 8/1982 |
| JP | H0880898 A | 3/1996 |
| JP | 200318275 A | 1/2003 |
| JP | 2003018275 A * | 1/2003 |
| JP | 2008102788 A | 5/2008 |
| WO | 2011056104 A1 | 5/2011 |

\* cited by examiner

REMOTE CONTROLLER AND HANDLE STRUCTURE THEREOF, AND METHOD FOR CONTROLLING A UAV

CROSS-REFERENCE TO RELATED APPLICATION

This is a continuation application of International Application No. PCT/CN2014/087325, filed on Sep. 24, 2014, the entire contents of which are incorporated herein by reference.

TECHNICAL FIELD

The present disclosure relates to a remote controlling device, in particular to a remote controller and a handle structure thereof, as well as a method for controlling an unmanned aerial vehicle (UAV) using the remote controller.

BACKGROUND

A handle structure of a traditional remote controller is in an upper-lower cover structure with a fixed size, has a regular appearance, and is difficult to extend according to requirements. For example, since the handle structure of the traditional remote controller has a fixed size, if the size is suitable for children, it might not be suitable for adults. As a result, the traditional remote controller may be inconvenient to use.

Moreover, there are many operation buttons or switches on the handle structure of the traditional remote controller, increasing the difficulty of operation by a user's fingers, thereby resulting in a more inconvenient use of the traditional remote controller.

SUMMARY

In view of this, the present disclosure provides a handle structure of a remote controller that is more convenient to operate.

In accordance with the present disclosure, there is provided a handle structure of a remote controller, comprising a left body including a left docking portion, a right body including a right docking portion configured to be docked with the left docking portion, and a connecting mechanism connecting the left docking portion and the right docking portion and configured to allow the left docking portion and the right docking portion to slide relatively to adjust an interval between an end of the left body and an end of the right body that are distal from each other.

As compared with the conventional technologies, the above-described remote controller may at least have the following advantages:

(1) The above-described handle structure of the remote controller may dock the left docking portion of the left body and the right docking portion of the right body together by the connecting mechanism, and the left docking portion of the left body and the right docking portion of the right body may slide relatively, such that the left body and the right body may be pulled apart relatively, to facilitate a user to operate the above-described remote controller. For example, when it is required that an interval between the ends of the left body and the right body that are distal from each other is increased, the left body and the right body may slide opposite to each other. When it is required that the interval between the ends of the left body and the right body that are distal from each other is decreased, the left body and the right body may slide towards each other.

(2) The left body and the right body of the above-described handle structure of the remote controller may slide relatively, and may function as a controlling switch structure of the remote controller, thereby expanding the functions of the remote controller, since the number of operation switches or buttons on the handle structure is decreased, the operation convenience of the above described handle structure of the remote controller can be improved.

In some embodiments, the handle structure further comprises a limiting mechanism configured to define sliding positions of the left docking portion and the right docking portion.

In some embodiments, the handle structure further comprises a guiding barrel sleeved at the left docking portion and the right docking portion.

In some embodiments, the guiding barrel includes a guiding portion arranged within the guiding barrel. At least one of the left docking portion or the right docking portion includes a fitting portion fitted with the guiding portion and configured to non-rotatably sleeve the guiding barrel on the left docking portion and the right docking portion. The left docking portion and the right docking portion are configured to slide along the guiding portion.

In some embodiments, the guiding portion includes a guiding plane provided at an inner wall of the guiding barrel and extending along an axial direction of the guiding barrel, and the fitting portion includes a fitting plane provided on the left docking portion or the right docking portion and extending along an axial direction of the left docking portion or the right docking portion.

In some embodiments, the guiding portion includes a guiding groove provided at an inner wall of the guiding barrel and extending along an axial direction of the guiding barrel, and the fitting portion includes a fitting post provided on the left docking portion or the right docking portion and disposed perpendicular to an axial direction of the left docking portion or the right docking portion.

In some embodiments, the connecting mechanism is provided within the guiding barrel and configured to slide the left body and the right body synchronously.

In some embodiments, the connecting mechanism comprises a left straight rack fixed on the left docking portion and disposed along a sliding direction of the left docking portion and a right straight rack fixed on the right docking portion and disposed along a sliding direction of the right docking portion. The right straight rack and the left straight rack being disposed spaced apart from and opposite to each other. The connecting mechanism further comprises a circular gear disposed between the left straight rack and the right straight rack and engaging with the left straight rack and the right straight rack simultaneously.

In some embodiments, a fixing shaft is provided within the guiding barrel, and the circular gear is sleeved on the fixing shaft and freely rotatable around the fixing shaft.

In some embodiments, the connecting mechanism comprises a left worm fixed on the left docking portion and disposed along a sliding direction of the left docking portion, a right worm fixed on the right docking portion and disposed along a sliding direction of the right docking portion, and a worm wheel disposed between the left worm and the right worm and engaging with the left worm and the right worm simultaneously.

In some embodiments, a fixing shaft is provided within the guiding barrel, and the worm wheel is sleeved on the fixing shaft and freely rotatable around the fixing shaft.

In some embodiments, the connecting mechanism comprises a left track segment fixed on the left docking portion and disposed along a sliding direction of the left docking portion, a right track segment fixed on the right docking portion and disposed along a sliding direction of the right docking portion, and a belt pulley disposed between the left track segment and the right track segment and engaging with the left track segment and the right track segment simultaneously.

In some embodiments, a fixing shaft is provided within the guiding barrel, and the belt pulley is sleeved on the fixing shaft and freely rotatable around the fixing shaft.

In some embodiments, the limiting mechanism comprises two limiting portions provided respectively at inner peripheries of two open ends of the guiding barrel, a left stop portion and a right stop portion respectively fixed at the left docking portion and the right docking portion, and the two limiting portions are fitted respectively with the left stop portion and the right stop portion to define respectively sliding positions of the left docking portion and the right docking portion within the guiding barrel.

In some embodiments, the left stop portion includes a left stop boss provided at a periphery of a free end of the left docking portion and extending along a circumferential direction of the left docking portion, the right stop portion includes a right stop boss provided at a periphery of a free end of the right docking portion and extending along a circumferential direction of the right docking portion, each of the limiting portions includes a limiting convex rib provided at an inner surface of the guiding barrel and extending along a circumferential direction of the guiding barrel, and the left stop boss and the right stop boss are configured to respectively abut against the two limiting convex ribs, to prevent the left docking portion and the right docking portion from releasing from the guiding barrel.

In some embodiments, the left stop portion includes a left stop groove provided on a periphery of a free end of the left docking portion and extending along an axial direction parallel to the left docking portion, the right stop portion includes a right stop groove provided on a periphery of a free end of the right docking portion and extending along an axial direction parallel to the right docking portion, each of the limiting portions includes a limiting post provided at an inner surface of the guiding barrel and disposed perpendicular to an axial direction of the guiding barrel, and one of the limiting posts is configured to slide within the left stop groove along an extending direction of the left stop groove and limited by side walls of two ends of the left stop groove, and another one of the limiting posts is configured to slide within the right stop groove along an extending direction of the right stop groove and limited by side walls of two ends of the right stop groove.

In some embodiments, the guiding barrel comprises a first guiding cover and a second guiding cover that are connected detachably to each other and jointly form the guiding barrel.

In some embodiments, a hook is provided at an edge of the first guiding cover that is connected with the second guiding cover, and a snap is provided at an edge of the second guiding cover that is connected with the first guiding cover and is configured to snap with the hook.

In some embodiments, a sliding groove is provided at an edge of the first guiding cover that is connected with the second guiding cover, one end of the sliding groove being an open end and another end of the sliding groove being a closed end, a sliding rail is provided at an edge of the second guiding cover that is connected with the first guiding cover, and the sliding rail is configured to slide into the sliding groove from the open end of the sliding groove and snap with the sliding groove.

In some embodiments, a first notch is provided at an edge of the first guiding cover that is connected with the second guiding cover, a second notch is provided at an edge of the second guiding cover that is connected with the first guiding cover, and the first notch and the second notch are disposed opposite to each other and jointly form a wiring hole for a wire to be inserted.

In some embodiments, the left body includes a first fitting surface extending along a sliding direction of the left body, the right body includes a second fitting surface extending along a sliding direction of the right body, the first fitting surface and the second fitting surface are disposed opposite to each other, the limiting mechanism comprises a sliding portion provided on the first fitting surface and a sliding limiting portion provided on the second fitting surface, and the sliding portion and the sliding limiting portion are configured to limit sliding positions of the left docking portion and the right docking portion.

In some embodiments, the sliding portion includes a sliding block provided on the first fitting surface and including a sliding groove, the sliding limiting portion includes a lead rail provided on the second fitting surface and extending along a sliding direction that the left docking portion and the right docking portion slide relatively, each of two ends of the lead rail including a stop end, and the lead rail is configured to fit with the sliding groove to allow the sliding block to slide along the lead rail and be limited by the stop ends of two ends of the lead rail.

In some embodiments, the sliding portion includes a sliding block provided on the first fitting surface, the sliding limiting portion includes a guiding groove provided on the second fitting surface and extending along a sliding direction that the left docking portion and the right docking portion slide relatively, and the sliding block is configured to slide within the guiding groove along an extending direction of the guiding groove, and be limited by side walls of two ends of the guiding groove.

In some embodiments, the sliding portion includes a pillar provided on the first fitting surface, the sliding limiting portion includes a guiding hole provided on the second fitting surface and penetrating through the right docking portion, the guiding hole extending along a sliding direction that the left docking portion and the right docking portion slide relatively, and the pillar is configured to slide within the guiding hole and be limited by side walls of two ends of the guiding hole.

In some embodiments, each of the left body and the right body includes an L-shaped structure, and the left body and the right body jointly form a U-shaped structure, the left docking portion is provided at one end of the left body, and the right docking portion is provided at one end of the right body, and a sliding direction that the left docking portion and the right docking portion slide relatively is parallel to a bottom of the U-shaped structure.

In some embodiments, a controlling button is provided at each of end surfaces of an end of the left body distal from the left docking portion and an end of the right body distal from the right docking portion.

In some embodiments, a controlling press rod is provided at each of peripheries of an end of the left body distal from the left docking portion and an end of the right body distal from the right docking portion.

In some embodiments, each of the left docking portion and the right docking portion includes a barrel structure, and the connecting mechanism is configured to be received within the left docking portion and the right docking portion.

In some embodiments, each of the left docking portion and the right docking portion includes a half cylindrical structure, and the left docking portion and the right docking portion are configured to jointly form a complete cylindrical structure.

In some embodiments, the handle structure further comprises a hand feel controlling mechanism configured to prompt a sliding distance that the left docking portion and the right docking portion slide relatively.

In some embodiments, the hand feel controlling mechanism comprises a carrying member provided on at least one of the left docking portion or the right docking portion and including a plurality of blocking portions disposed spaced apart from each other, the plurality of blocking portions being arranged along a straight line parallel to a sliding direction that the left docking portion and the right docking portion slide relatively, and an elastic component provided on an inner wall of the guiding barrel and selectively abutting against one of the plurality of blocking portions. The elastic component is configured to deform elastically and move over an abutted blocking portion when the left docking portion and the right docking portion slide relatively, thereby providing a sense of damping.

In some embodiments, the hand feel controlling mechanism comprises a carrying member provided on one of the left docking portion and the right docking portion and including a plurality of blocking portions disposed spaced apart from each other, the plurality of blocking portions being arranged along a straight line parallel to a sliding direction that the left docking portion and the right docking portion slide relatively, and an elastic component provided on another one of the left docking portion and the right docking portion and selectively abutting against one of the plurality of blocking portions. The elastic component is configured to deform elastically and move over an abutted blocking portion when the left docking portion and the right docking portion slide relatively, thereby providing a sense of damping.

In some embodiments, the elastic component comprises a support post, a compression spring, and a bead. A receiving hole extending along an axial direction of the support post is provided at an end surface of a free end of the support post. The compression spring is received within the receiving hole. The bead is mounted at an opening of the receiving hole and abutting against the compression spring. Each of the blocking portions includes a blocking convex rib or a blocking recess provided on the carrying member.

In some embodiments, the elastic component includes flat spring, and each of the blocking portions includes a blocking convex rib or a blocking recess provided on the carrying member.

Also in accordance with the present disclosure, there is provided a remote controller comprising one of the above-described handle structures, a sensor mounted on the handle structure and configured to sense a relative position of the left body and the right body, and a controller mounted on the handle structure and connected in communication with the sensor. The sensor is configured to generate a position signal and sends the position signal to the controller when sensing a change in the relative position of the left body and the right body, and the controller is configured to send out a control signal according to the position signal.

In some embodiments, the remote controller further comprises a power switch configured to control a power supply of the remote controller. The power switch is connected in communication with the controller. The controller is further configured to control power-on and power off states of the power switch according to the position signal.

In some embodiments, the remote controller further comprises a wireless signal transmitting device connected in communication with the controller. The controller is further configured to transmit the control signal through the wireless signal transmitting device.

In some embodiments, the control signal comprises at least one of the followings: a signal for controlling an extension-retraction state of an undercarriage of an unmanned aerial vehicle (UAV), a signal for controlling a deformation state of a wing of the UAV, a signal for controlling automatic return of the UAV, or a signal for controlling automatic take-off of the UAV.

In some embodiments, the sensor comprises at least one of the followings: a photoelectric sensor, a proximity sensor, or a linear displacement sensor.

In some embodiments, the relative position of the left body and the right body sensed by the sensor comprises a plurality of trigger positions disposed spaced apart from each other. The plurality of trigger positions correspond to a plurality of control signals, respectively.

Also in accordance with the present disclosure, there is provided a method for controlling an unmanned aerial vehicle (UAV) using any one of the above-described remote controller, comprising sending out the control signal by the remote controller when the left body and the right body are pulled apart to a trigger position, and receiving the control signal and performing a corresponding action by the UAV.

In some embodiments, performing the corresponding action comprises performing at least one of the followings: extension-retraction of an undercarriage, deformation of a wing, automatic return, or automatic take-off.

In some embodiments, sending out the control signal when the left body and the right body are pulled apart to the trigger position comprises sending out one of a plurality of control signals when the left body and the right body are pulled apart to one of a plurality of trigger positions that correspond to a plurality of actions respectively.

DETAILED DESCRIPTION OF THE EMBODIMENTS

Figure 1:
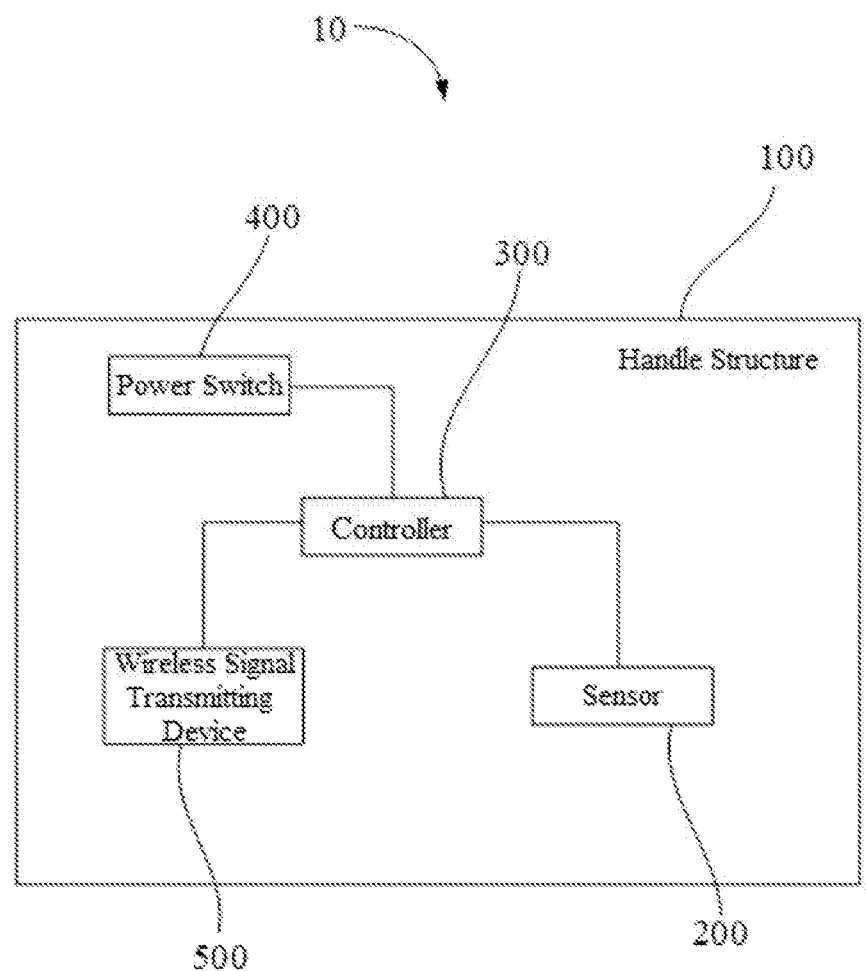
FIG. 1 is a principle diagram of a remote controller according to an embodiment of the present disclosure.

The technical solutions of the present disclosure will be described in more detail below in combination with the drawings in the embodiments of the present disclosure. It should be appreciated that embodiments described herein are only some rather than all of the embodiments of the present disclosure. All other embodiments obtained by those having ordinary skills in the art on the basis of the embodiments of the present disclosure without any inventive efforts should fall within the scope of the present disclosure.

It is explained that, when a component is referred to as "being fixed to" another component, the component may be directly on another component or an intermediate component might be present. When one component is considered as "being connected to" another component, the one component may be connected directly to another component or an intermediate component might be present simultaneously. As used herein, terms "perpendicular", "horizontal", "left", "right" and similar expressions are only for illustrative purposes.

Unless otherwise defined, all technical and scientific terms as used herein have the same meanings as those generally understood by persons of ordinary skill in the art. Terms used herein in the specification of the present disclosure are only for the purpose of describing specific embodiments, and not intended to limit the present disclosure. The term "and/or" used herein includes any and all combination(s) of one or more related listed items.

An embodiment of the present disclosure provides a remote controller suitable for remotely controlling an unmanned aerial vehicle (UAV), a ground remotely controlled chariot, or the like.

The remote controller may comprise a handle structure, a sensor, and a controller. The handle structure may comprise a left body, a right body, and a connecting mechanism configured for slidably connecting the left body and the right body. The sensor may be configured for sensing a relative position of the left body and the right body. The controller may send out a corresponding control signal according to changes in positions of the left body and the right body.

In some embodiments, the left body and the right body may slide synchronously, i.e., the left body and the right body may slide synchronously with a middle position between the left and right bodies as a reference position. The left body and the right body may slide asynchronously. For example, the right body may partially extend out of or into the left body.

In some embodiments, the connecting mechanism may have one of a variety of structures. For example, the connecting mechanism may be a fitting structure of a gear and rack, a fitting structure of a worm wheel and a worm, a fitting structure of a track and belt pulley, or the like.

In some embodiments, the left body and the right body may each have an L-shaped structure, and may jointly form a U-shaped structure.

In some embodiments, docking portions of the left body and the right body may each have a solid structure. For example, the docking portions of the left body and the right body may each have a half cylindrical structure and may jointly form a complete cylindrical structure.

In some embodiments, the docking portions of the left body and the right body may each have a hollow structure, such as a barrel structure, and the connecting mechanism may be received within the barrel structures.

In some embodiments, the remote controller may further comprise a limiting mechanism for defining sliding positions of the left docking portion and the right docking portion.

In some embodiments, the remote controller may further comprise a hand feel controlling mechanism for prompting a sliding distance of a relative slide between the left body and the right body.

In some embodiments, the remote controller itself may be controlled by changing the relative position of the left body and the right body. For example, the remote controller may comprise a power switch for controlling a power supply of the remote controller. The power switch may be connected in communication with the controller. Power-on and power-off states of the power switch may be controlled by changing the relative position of the left body and the right body.

In some embodiments, a remotely controlled object of the remote controller may be controlled by changing the relative position of the left body and the right body. For example, the remote controller may comprise a wireless signal transmitting device. The controller may be connected in communication with the wireless signal transmitting device and transmit the control signal through the wireless signal transmitting device.

In some embodiments, the relative position of the left body and the right body sensed by the sensor may be one of a plurality of trigger positions respectively corresponding to a plurality of different or same control signals.

Based on the above-described remote controller, the present disclosure further provides a method for controlling a UAV, including controlling the UAV to perform a corresponding action by pulling the left body and the right body of the remote controller apart to a trigger position.

In some embodiments, there may be a plurality of trigger positions respectively corresponding to a plurality of different corresponding actions.

In some embodiments, the corresponding actions may comprise at least one of the following: extension-retraction of an undercarriage, deformation of a wing, automatic return, or automatic take-off.

Some embodiments of the present disclosure will be described in details below in conjunction with the drawings.

Referring to FIG. 1, a remote controller 10 according to an embodiment of the present disclosure may comprise a handle structure 100, a sensor 200 mounted on the handle structure 100, and a controller 300 mounted on the handle structure 100.

Figure 2:
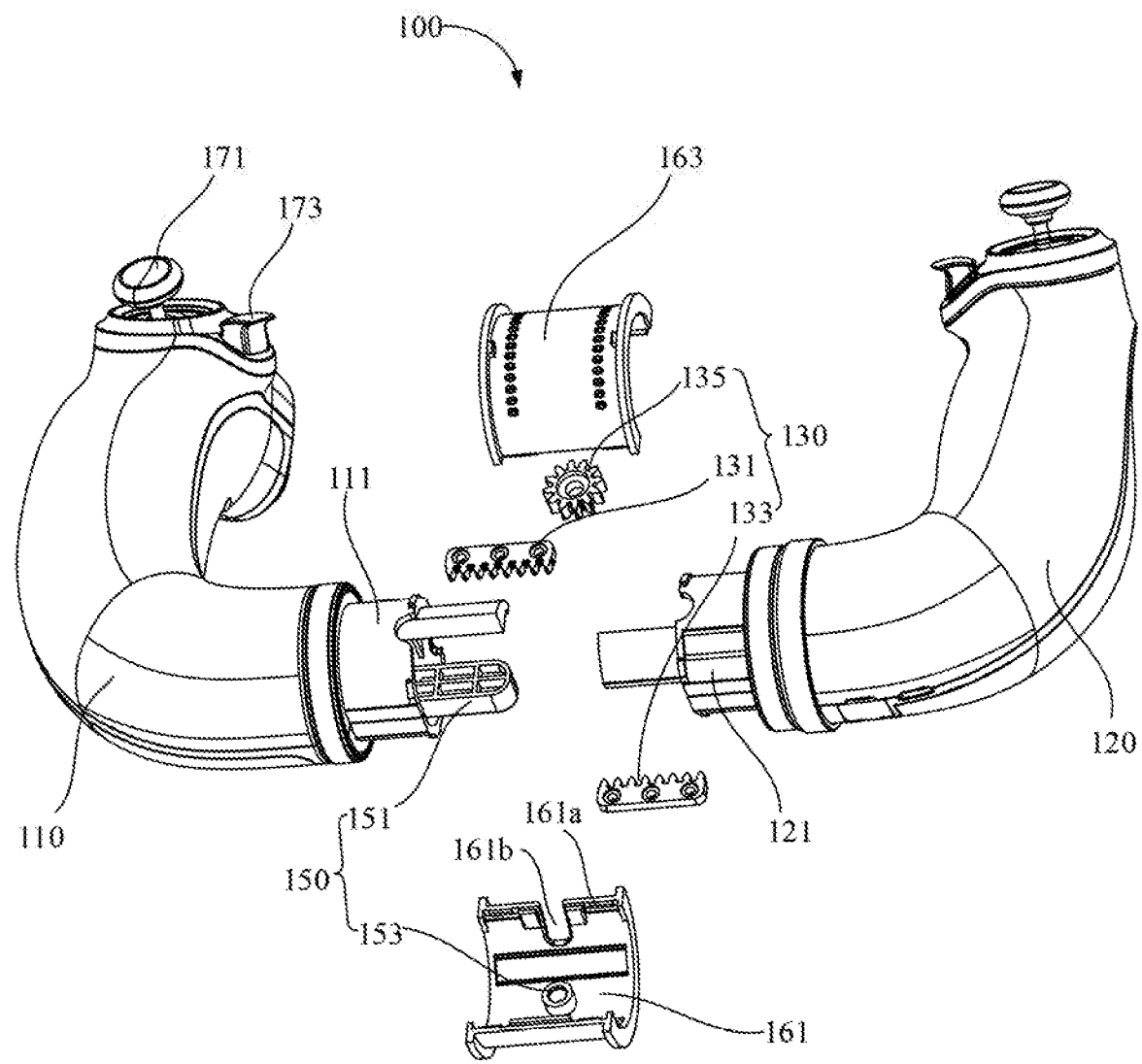
FIG. 2 is an exploded view of a handle structure of a remote controller according to an embodiment of the present disclosure.
Figure 3:
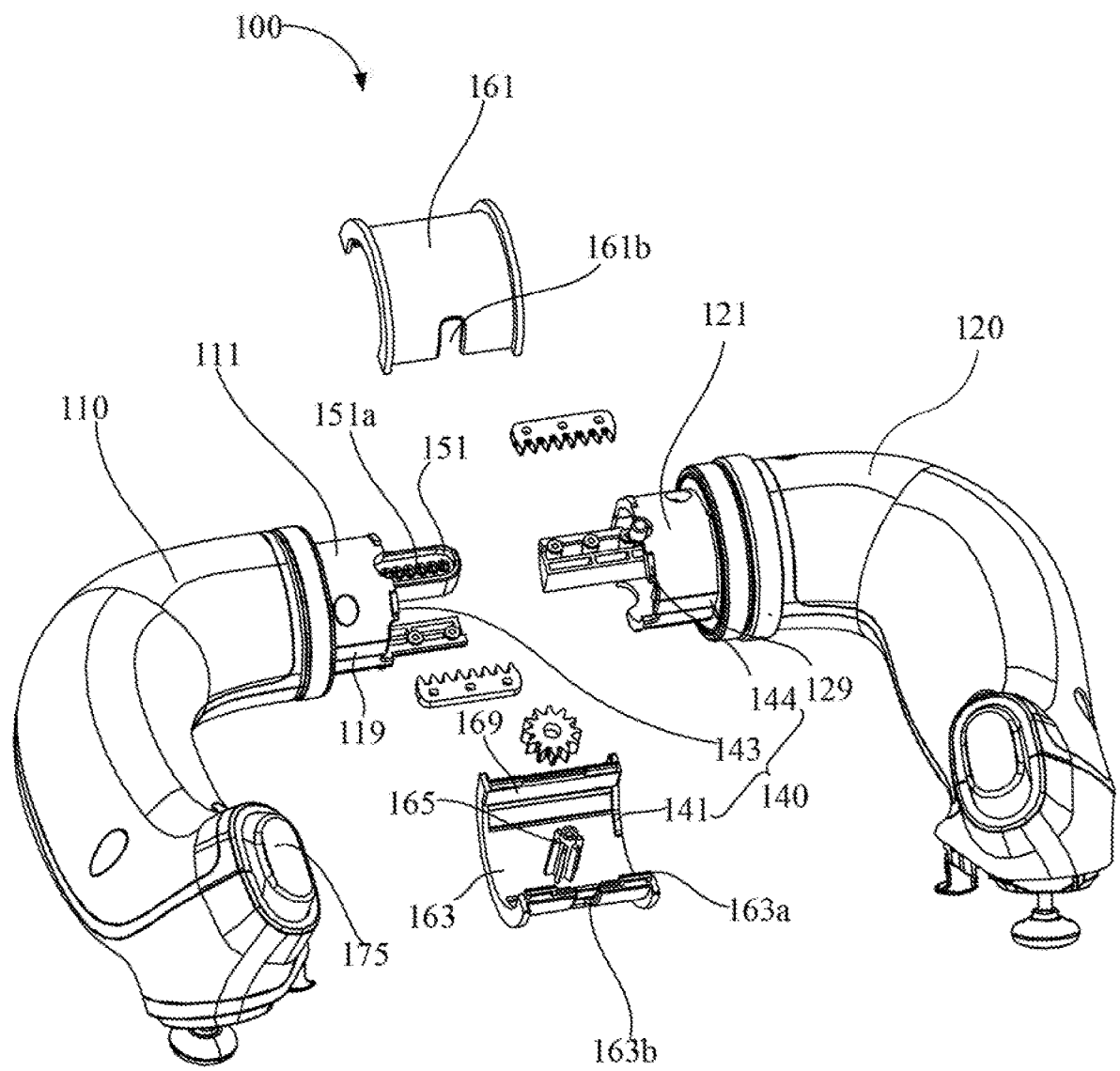
FIG. 3 is an exploded view of the handle structure of the remote controller as shown in FIG. 2 in another angle of view.

Referring to FIGS. 2 and 3, the handle structure 100 may comprise a left body 110, a right body 120, a connecting mechanism 130, a limiting mechanism 140, a hand feel controlling mechanism 150.

The left body 110 may be provided with a left docking portion 111. The right body 120 may be provided with a right docking portion 121 to be docked with the left docking portion 111.

It is noted that, the left docking portion 111 of the left body 110 and the right docking portion 121 of the right body 120 may be docked directly, or docked indirectly through a component such as a sleeve.

In some embodiments, as shown in the figures, the left body 110 and the right body 120 may each have an L-shaped structure and jointly form a U-shaped structure. The left docking portion 111 may be provided at one end of the left body 110. The right docking portion 121 may be provided at one end of the right body 120.

The left body 110 and the right body 120 are not limited to the L-shaped structure, and other structures may be possible. For example, the left body 110 and the right body 120 may each have a square structure and may jointly form a rectangular structure.

Further, an end of the left body 110 distal from the left docking portion 111 and an end of the right body 120 distal from the right docking portion 121 may each be provided with a controlling stick 171, i.e., a left controlling stick, a right controlling stick. The controlling stick 171 may control a remotely controlled object. For example, the controlling stick 171 may perform direction controls of "front, back, left, right, up, down" and the like, or speed controls of "acceleration, deceleration" on the remotely controlled object.

Further, the peripheries of the end of the left body 110 distal from the left docking portion 11 and the end of the right body 120 distal from the right docking portion 121 may each be provided with a controlling press rod 173. End surfaces of the end of the left body 110 distal from the left docking portion 111 and the end of the right body 120 distal from the right docking portion 121 may each be provided with a controlling button 175. The controlling press rod 173 and the controlling button 175 may control the remotely controlled object. For example, the controlling press rod 173 can be used to perform action controls of "launch," "attack," and the like on the remotely controlled object, and/or to perform operation controls of "stop moving" and "return to the destination" on the remotely controlled object.

The left docking portion 111 and the right docking portion 121 may each have a hollow structure. For example, in the illustrated embodiments, each of the left docking portion 111 and the right docking portion 121 may have a barrel structure. The connecting mechanism 130 may be received within the left docking portion 111 and the right docking portion 121. In some embodiments, the left docking portion 111 and the right docking portion 121 may be circular barrels whose opening ends may be docked together. The connecting mechanism 130 may be disposed between the opening ends of the two circular barrels. In some embodiments, the left docking portion 111 may be provided with a first fitting portion 119, and the right docking portion 121 may be provided with a second fitting portion 129.

The left docking portion 111 and the right docking portion 121 may each have a solid structure. For example, in some embodiments, each of the left docking portion 111 and the right docking portion 121 may have a half cylindrical structure, and may jointly form a complete cylindrical structure.

The connecting mechanism 130 may be configured to connect the left docking portion 111 and the right docking portion 121, to dock the left docking portion 111 with the right docking portion 121 to form a body of the handle structure 100. The connecting mechanism 130 may allow the left docking portion 111 and the right docking portion 121 to slide relatively, to adjust an interval between the ends of the left body 110 and the right body 120 that are distal from each other.

The connecting mechanism 130 can allow the left body 110 and the right body 120 to slide synchronously or asynchronously. Moreover, a sliding direction that the left body 110 and the right body 120 slide relatively may be designed according to actual requirements. For example, the left body 110 and the right body 120 may slide in a direction perpendicular to the symmetrical axis of the body of the handle structure 100, or slide along directions in a "V" shape respectively.

In some embodiments, as shown in the figures, the left body 110 and the right body 120 may jointly form a U-shaped structure, and slide synchronously. The sliding direction that the left body 110 and the right body 120 slide relatively may be parallel to the bottom of the U-shaped structure.

Figure 4:
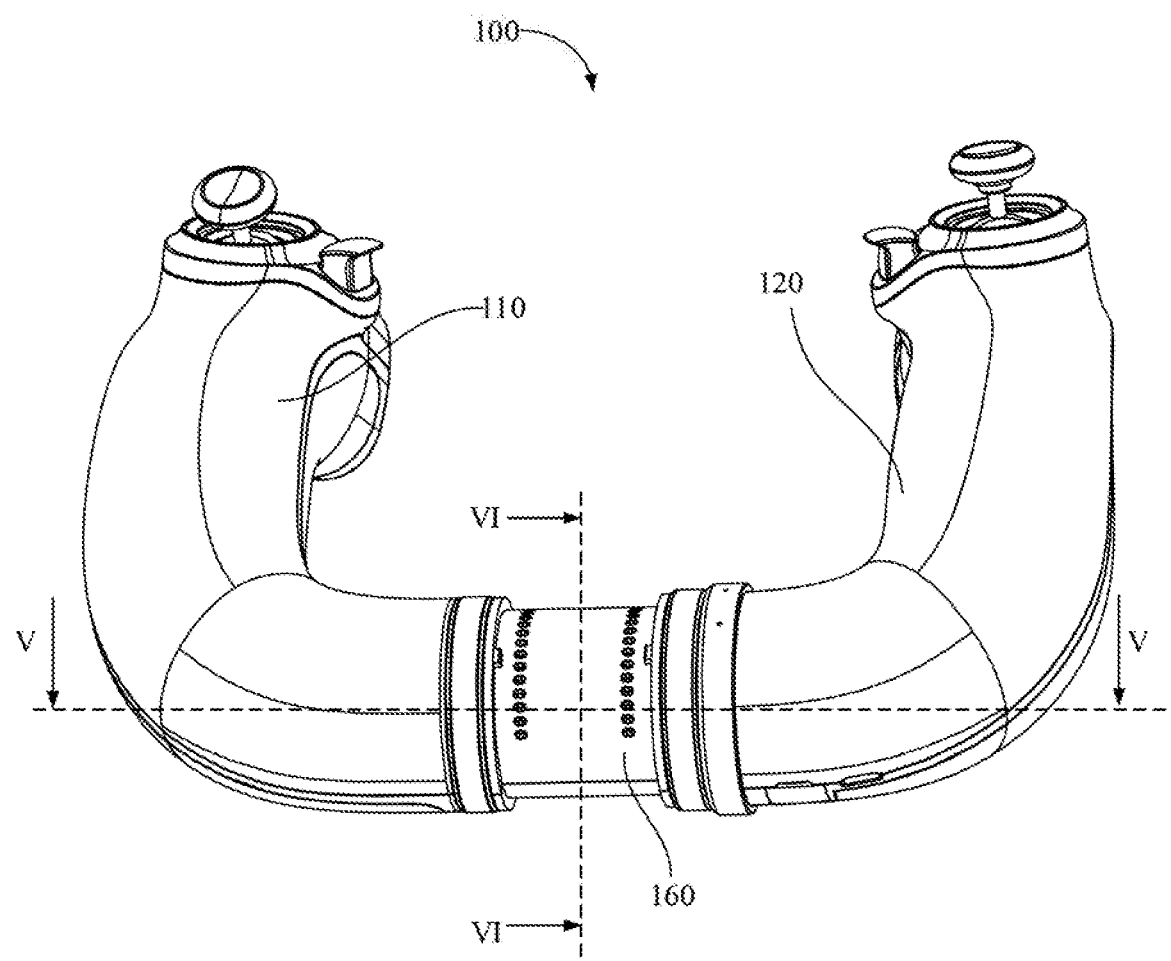
FIG. 4 is an assembly view of the handle structure of the remote controller as shown in FIG. 2.

Referring to FIG. 4, a guiding barrel 160 may be sleeved on the connecting mechanism 130, the left docking portion 111 of the left body 110, and the right docking portion 121 of the right body 120. The connecting mechanism 130 may be disposed within the guiding barrel 160, such that the guiding barrel 160 may cover the connecting mechanism 130, and perform a guiding function when the left docking portion 111 and the right docking portion 121 slide.

In some embodiments, as shown in the figures, a guiding portion 169 fitting the first fitting portion 119 and the second fitting portion 129 may be provided within the guiding barrel 160, to non-rotatably sleeve the guiding barrel 160 on the left docking portion 111 and the right docking portion 121, i.e., the guiding barrel 100 may not rotate after being sleeved on the left docking portion 111 and the right docking portion 121. The left docking portion 111 and the right docking portion 121 may slide along the guiding portion 169.

It is noted that, in some embodiments, only one of the first fitting portion 119 and the second fitting portion 129 may be provided. For example, only the left docking portion 111 may be provided with the first fitting portion 119 thereon, or only the right docking portion 121 may be provided with the second fitting portion 129.

The first fitting portion 119, the second fitting portion 129, and the guiding portion 169 may have different structures. For example, in the illustrated embodiments, the guiding portion 169 may be a guiding plane provided on an inner wall of the guiding barrel 160 and extending along an axial direction of the guiding barrel 160. The first fitting portion 119 and the second fitting portion 129 may be fitting planes respectively provided on the left docking portion 111 and the right docking portion 121, and respectively extending along axial directions of the left docking portion 111 and the right docking portion 121.

In some embodiments, the guiding portion 169 may be a guiding groove provided at an inner wall of the guiding barrel 160 and extending along the axial direction of the guiding barrel 160. The first fitting portion 119 and the second fitting portion 129 may be fitting posts provided respectively on the left docking portion 111 and the right docking portion 121 and disposed respectively perpendicular to the axial directions of the left docking portion 111 and the right docking portion 121.

The guiding barrel 160 may be formed integrally or in an assembled structure. For example, as shown in FIG. 3, in the illustrated embodiments, the guiding barrel 160 may comprise a guiding cover A 161 and a guiding cover B 163 that may be detachably connected to each other and jointly form the guiding barrel 160.

In some embodiments, each of the left docking portion 111 and the right docking portion 121 may be a circular barrel. The guiding barrel 160 may be a circular barrel having a shape matching the left docking portion 111 and the right docking portion 121. The guiding cover A 161 and the guiding cover B 163 may be half circular covering bodies.

The manner of detachably connecting the guiding cover A 161 and the guiding cover B 163 may be designed according to different requirements. For example, as shown in FIGS. 2 and 3, in the illustrated embodiments, the edge of the guiding cover A 161 that connects with the guiding cover B 163 may be provided with a hook 161a. The edge of the guiding cover B 163 that connects with the guiding cover A 161 may be provided with a snap 163a that can be snapped with the hook 161a.

In some other embodiments, the edge of the guiding cover A 161 that connects with the guiding cover B 163 may be provided with a sliding groove. One end of the sliding groove is an open end and another end of the sliding groove is a closed end. The edge of the guiding cover B 163 that connects with the guiding cover A 161 may be provided with a sliding rail that may slide into the sliding groove from the open end of the sliding groove and be snapped with the sliding groove.

Further, the edge of the guiding cover A 161 that connects with the guiding cover B 163 may be provided with a first notch 161*b*. The edge of the guiding cover B 163 that connects with the guiding cover A 161 may be provided with a second notch 163*b*. The first notch 161*b* and the second notch 163*b* may be disposed opposite to each other and jointly form a wiring hole for a wire to be inserted therethrough.

Figure 5:
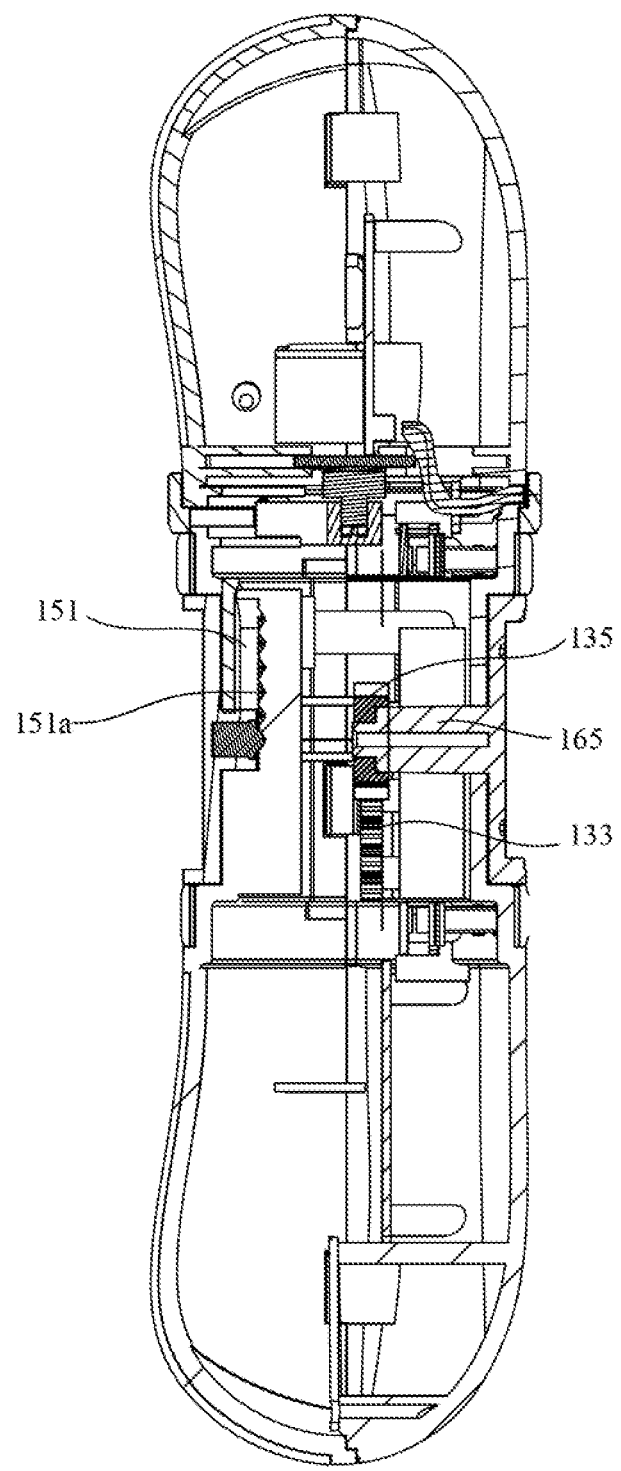
FIG. 5 is a cross sectional view taken along line V-V in FIG. 4.
Figure 7:
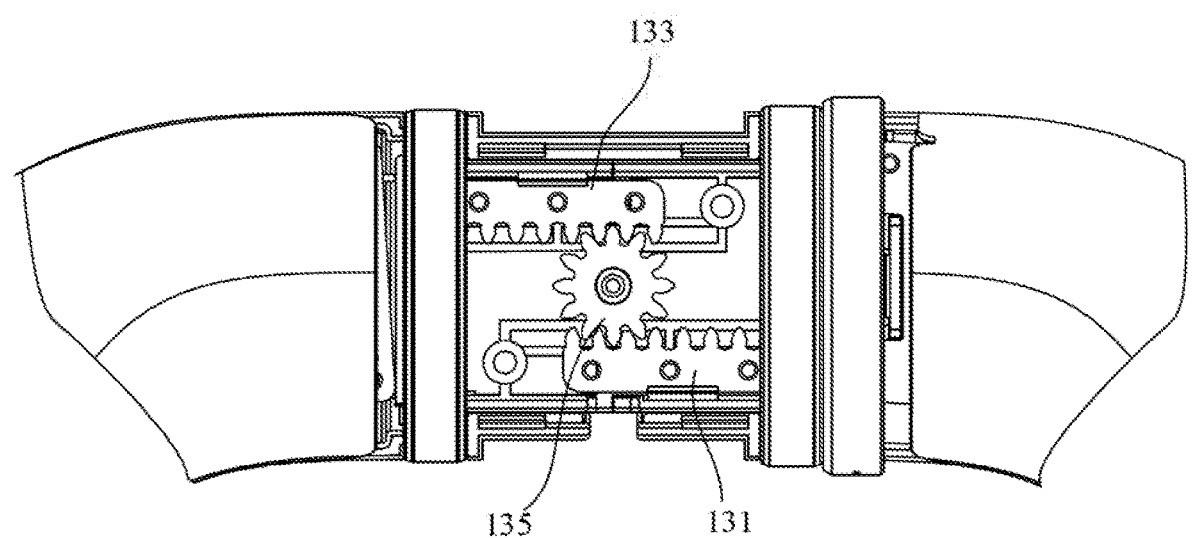
FIG. 7 is a partial schematic view of the handle structure of the remote controller as shown in FIG. 2.
Figure 8:
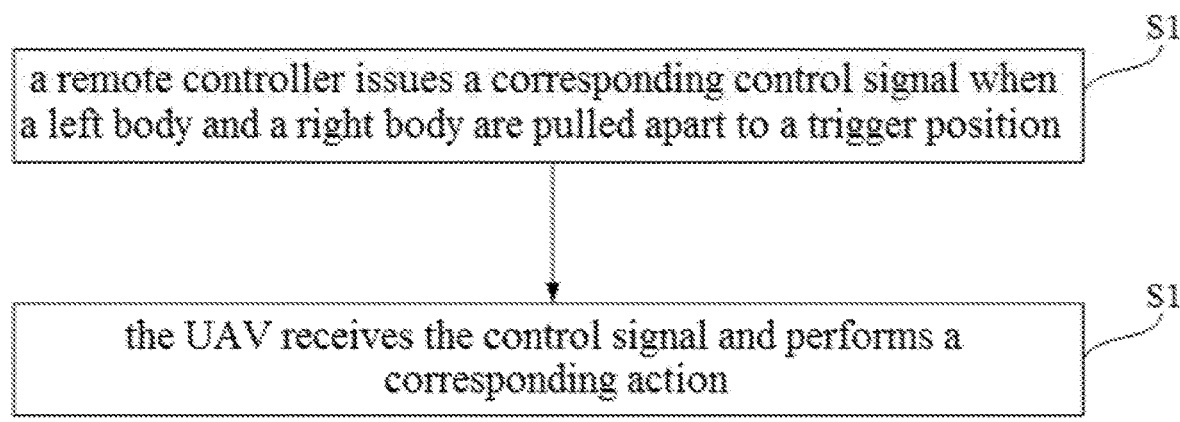
FIG. 8 is a flow chart of a method for controlling a UAV according to an embodiment of the present disclosure.

Referring to FIGS. 5 and 7, the specific structure of the connecting mechanism 130 may be designed according to different requirements. For example, in the illustrated embodiments, the connecting mechanism 130 may comprise a left straight rack 131, a right straight rack 133, and a circular gear 135. The left straight rack 131 may be fixed on the left docking portion 111 and disposed along the sliding direction of the left docking portion 111. The right straight rack 133 may be fixed on the right docking portion 121 and disposed along the sliding direction of the right docking portion 121. The right straight rack 133 and the left straight rack 131 may be disposed spaced apart from and opposite to each other. The circular gear 135 may be disposed between the left straight rack 131 and the right straight rack 133, and may engage with the left straight rack 131 and the right rack 133 simultaneously.

Further, a fixing shaft 165 may be provided within the guiding barrel 160. The circular gear 135 may be sleeved on and may rotate freely around the fixing shaft 165. In some embodiments, the circular gear 135 may be suspended, and the position of the circular gear 135 may be limited as a result of the engagement with the left straight rack 131 and the right straight rack 133.

In some other embodiments, the connecting mechanism 130 may comprise a left worm, a right worm, and a worm wheel. The left worm may be fixed on the left docking portion 111 and disposed along the sliding direction of the left docking portion 111. The right worm may be fixed on the right docking portion 121 and disposed along the sliding direction of the right docking portion 121. The worm wheel may be disposed between the left worm and the right worm, and may engage with them simultaneously.

Further, the fixing shaft 165 may be provided within the guiding barrel 160. The worm wheel may be sleeved on and may rotate freely around the fixing shaft 165. In some embodiments, the worm wheel may be suspended and the position of the worm wheel may be limited due to the engagement with the left worm and the right worm.

In some embodiments, the connecting mechanism 130 may comprise a left track segment, a right track segment, and a belt pulley. The left track segment may be fixed on the left docking portion 111 and disposed along the sliding direction of the left docking portion 111. The right track segment may be fixed on the right docking portion 121 and disposed along the sliding direction of the right docking portion 121. The belt pulley may be disposed between the left track segment and the right track segment, and may engage with them simultaneously.

Further, the fixing shaft 165 may be provided within the guiding barrel 160. The belt pulley may be sleeved on and may rotate freely around the fixing shaft 165. In some embodiments, the belt pulley may be suspended, and the position of the belt pulley may be limited due to the engagement with the left track segment and the right track segment.

The limiting mechanism 140 may be configured to define the sliding positions of the left docking portion 111 and the right docking position 121. For example, the limiting mechanism 140 may define positions that the left docking portion 111 and the right docking portion 121 may slide relatively to a maximum interval, or positions that the left docking portion 111 and the right docking portion 121 may slide relatively to the minimum interval. In some embodiments, the limiting mechanism 140 may define positions that the left docking portion 111 and the right docking portion 121 may slide relatively to the maximum interval and the minimum interval simultaneously.

The specific structure of the limiting mechanism 140 may be designed according to actual requirements. For example, as shown in FIG. 3, in the illustrated embodiments, the limiting mechanism 140 may comprise a limiting portion 141 provided on the guiding barrel 160, and a left stop portion 143 and a right stop portion 144 respectively fixed at the left docking portion 111 and the right docking portion 121. In some embodiments, two limiting portions 141 may be provided and disposed respectively at the inner peripheries of two open ends of the guiding barrel 160. The two limiting portions 141 may be fitted respectively with the left stop portion 143 and the right stop portion 144 to define respectively the sliding positions of the left docking portion 111 and the right docking portion 121 within the guiding barrel 160.

The specific structures of the left stop portion 143 and the right stop portion 144 may be designed according to different requirements. For example, in the illustrated embodiments, the left stop portion 143 may be a left stop boss that may be provided on the periphery of a free end of the left docking portion 111 and may extend along a circumferential direction of the left docking portion 111. The right stop portion 144 may be a right stop boss that may be provided on the periphery of a free end of the right docking portion 121 and may extend along a circumferential direction of the right docking portion 121. Each of the limiting portions 141 may be a limiting convex rib provided at an inner surface of the guiding barrel 160 and extending along the circumferential direction of the guiding barrel 160. In some embodiments, the left stop boss and the right stop boss may abut against two limiting convex ribs respectively, to prevent the left docking portion 111 and the right docking portion 121 from releasing from the guiding barrel 160.

In some other embodiments, the left stop portion 143 may be a left stop groove provided on the periphery of the free end of the left docking portion 111 and extending along an axial direction parallel to the left docking portion 111. The right stop portion 144 may be a right stop groove provided on the periphery of the free end of the right docking portion 121 and extending along an axial direction parallel to the right docking portion 121. Each of the limiting portions 141 may be a limiting post provided at an inner surface of the guiding barrel 160 and disposed perpendicular to the axial direction of the guiding barrel 160. One of the limiting posts may slide within the left stop groove along an extending direction of the left stop groove, and the position of the one of the limiting posts may be limited by side walls at two ends of the left stop groove. Another one of the limiting posts may slide within the right stop groove along an extending direction of the right stop groove, and the position of the other one of the limiting posts may be limited by side walls at two ends of the right stop groove.

The specific structure of the limiting mechanism 140 may be not limited to the illustrated structure, and may have another structure. For example, in some other embodiments, the left body 110 may be provided with a first fitting surface extending along the sliding direction of the left body 110, and the right body 120 may be provided with a second fitting surface extending along the sliding direction of the right body 120. The first fitting surface and the second fitting surface may be disposed opposite to each other. The limiting mechanism 140 may comprise a sliding portion provided on the first fitting surface and a sliding limiting portion provided on the second fitting surface, the sliding portion may be fitted with the sliding limiting portion to limit the sliding positions of the left docking portion 111 and the right docking portion 121.

The specific structures of the sliding portion and the sliding limiting portion may be designed according to different requirements. For example, in some embodiments, the sliding portion may be a sliding block provided on the first fitting surface, and the sliding block may be provided with a sliding groove. The sliding limiting portion may be a lead rail provided on the second fitting surface and extending along the sliding direction that the left docking portion 111 and the right docking portion 121 slide relatively. Each of two ends of the lead rail may be a stop end. The lead rail may fit with the sliding groove to allow the sliding block to slide along the lead rail. The position of the sliding block may be limited by the stop ends of the two ends of the lead rail. For example, the cross section of the lead rail may be in a dovetail shape, and the sliding groove may be a dovetail groove.

In some embodiments, the sliding portion may be a sliding block provided on the first fitting surface, and the sliding limiting portion may be a guiding groove provided on the second fitting surface and extending along the sliding direction that the left docking portion 111 and the right docking portion 121 slide relatively. The sliding block may slide within the guiding groove along the extending direction of the guiding groove, and the position of the sliding block may be limited by side walls at two ends of the guiding groove.

In some embodiments, the sliding portion may be a pillar provided on the first fitting surface, and the sliding limiting portion may be a guiding hole provided on the second fitting surface and penetrating through the right docking portion 121. The guiding hole may extend along the sliding direction that the left docking portion 111 and the right docking portion 121 slide relatively. The pillar may slide within the guiding hole, and the position of the pillar may be limited by side walls at two ends of the guiding hole.

A hand feel controlling mechanism 150 may be configured to prompt a sliding distance that the left docking portion 111 of the left body 110 and the right docking portion 121 of the right body 120 slide relatively. For example, when an operator pulls the left body 110 and the right body 120 apart, the hand feel controlling mechanism 150 may provide the operator with an intermittent sense of damping, to prompt the operator of a distance between the left body 110 and the right body 120.

Figure 6:
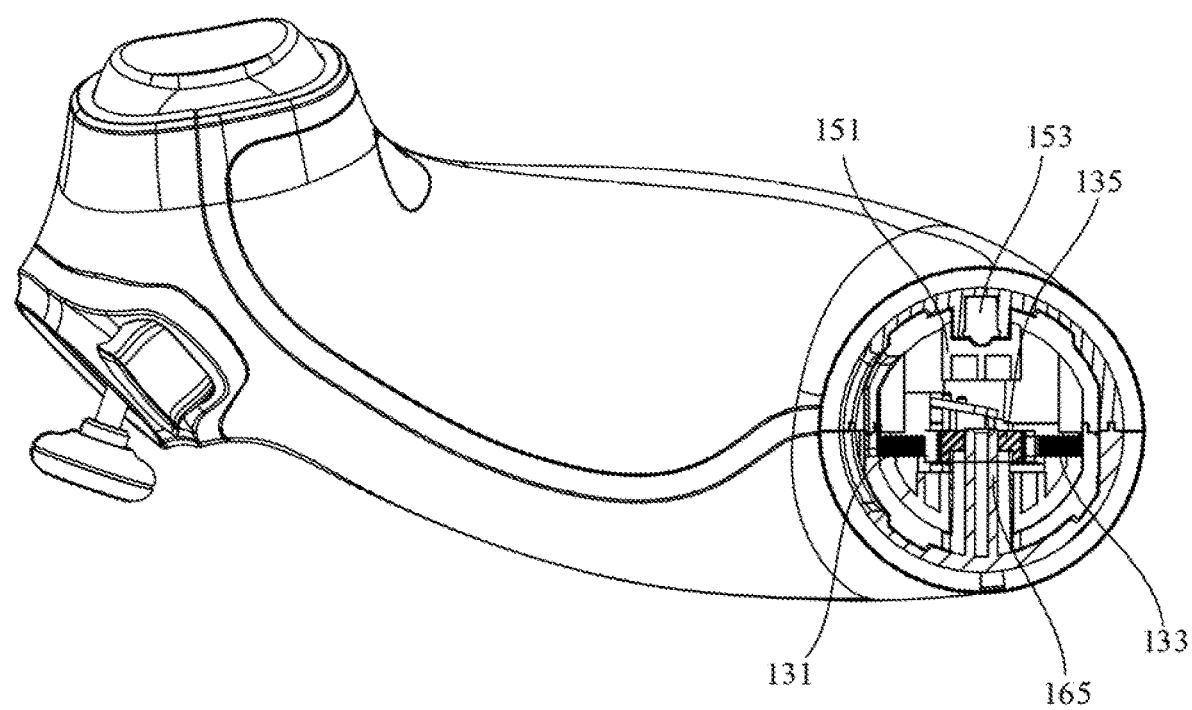
FIG. 6 is a cross sectional view taken along line VI-VI in FIG. 4.

The specific structure of the hand feel controlling mechanism 150 may be designed according to different requirements. For example, as shown in FIGS. 2 and 6, in the illustrated embodiments, the hand feel controlling mechanism 150 may comprise a carrying member 151 provided on at least one of the left docking portion 111 or the right docking portion 121, and an elastic component 153 provided on an inner wall of the guiding barrel 160. A plurality of blocking portions 151a disposed spaced apart from each other and arranged along a straight line may be provided on the carrying member 151. The plurality of blocking portions 151a may be arranged parallel to a sliding direction. The elastic component 153 may selectively abut against one of the blocking portions 151a. When the left docking portion 111 and the right docking portion 121 slide relatively, the elastic component 153 may deform elastically and move over the abutted blocking portion 151a, thereby providing a sense of damping.

In some other embodiments, the hand feel controlling mechanism 150 may comprise the carrying member 151 provided on one of the left docking portion 111 and the right docking portion 121, and the elastic component 153 provided on another one of the left docking portion 111 and the right docking portion 121. A plurality of blocking portions 151a disposed spaced apart from each other and arranged along a straight line may be provided on the carrying member 151, and arranged parallel to the sliding direction. The elastic component 153 may selectively abut against one of the plurality of blocking portions 151a. When the left docking portion 111 and the right docking portion 121 slide relatively, the elastic component 153 may deform elastically and move over the abutted blocking portion 151a, thereby providing a sense of damping.

The specific structures of the elastic component 153 and the blocking portions 151a may vary. For example, in some embodiments, the elastic component 153 may comprise a support post, a compression spring, and a bead. An end surface of a free end of the support post may be provided with a receiving hole extending along an axial direction of the support post. The compression spring may be received within the receiving hole. The bead may be mounted at an opening of the receiving hole and may abut against the compression spring. The blocking portions 151a may be blocking convex ribs or a blocking recesses provided on the carrying member 151.

In some embodiments, the elastic component 153 may be a flat spring. The blocking portions 151a may be blocking convex ribs or blocking recesses provided on the carrying member 151.

The sensor 200 may be configured to sense a relative position of the left body 110 and the right body 120. For example, the sensor 200 may be a photoelectric sensor, a proximity sensor, a linear displacement sensor, or the like. In some embodiments, the photoelectric sensor may be a diffuse reflection photoelectric switch, a mirror reflection photoelectric switch, a correlation photoelectric switch, a groove-type photoelectric switch, a fiber photoelectric switch, or the like. The proximity sensor may be an inductance proximity switch, a resistance proximity switch, a capacitance proximity switch, a photoelectric proximity switch, or the like. The linear displacement sensor may be a metal membrane displacement sensor, a conductive plastic displacement sensor, a photoelectric displacement sensor, a magnetic sensitive displacement sensor, a metal uranium glass displacement sensor, a winding displacement sensor, or the like.

The sensor 200 may sense one trigger position in relative positions of the left body 110 and the right body 120. For example, when the sensor 200 is a photoelectric sensor or a proximity sensor, the sensor 200 may be triggered when the left body 110 and the right body 120 slide relatively to the trigger position of the sensor 200.

The sensor 200 also may sense a plurality of trigger positions in the relative positions of the left body 110 and the right body 120. For example, in some embodiments, when there are multiple sensors 200, each of which is a photoelectric sensor or a proximity sensor, a corresponding sensor 200 may be triggered as the left body 110 and the right body 120 slide relatively to the trigger position of the sensor 200.

In some embodiments, the sensor 200 is a linear displacement sensor. When the linear displacement sensor senses that the left body 110 and the right body 120 slide relatively to a preset position, the linear displacement sensor may send out a corresponding trigger signal.

It is noted that, the relative positions of the left body 110 and the right body 120 sensed by the sensor 200 may comprise a plurality of trigger positions disposed spaced apart from each other that may correspond to a plurality of different control signals, respectively.

Referring to FIG. 1, the controller 300 may be connected in communication with the sensor 200. When the sensor 200 senses a change in a relative position of the left body 110 and the right body 120, the sensor 200 may generate and send a position signal to the controller 300. The controller 300 may send out a corresponding control signal according to the position signal.

The position signal may comprise coordinate information of a trigger position. For example, a coordinate is zero when the left docking portion 111 of the left body 110 and the right docking portion 121 of the right body 120 are fully docked. The coordinate is Lmax when the left docking portion 111 of the left body 110 and the right docking portion 121 of the right body 120 are fully pulled apart. The coordinates of a plurality of trigger positions in between may be include: the coordinate L1 of a first trigger position, the coordinate L2 of a second trigger position, the coordinate L3 of a third trigger position, and the coordinate L4 of a fourth trigger position.

The controller 300, according to the coordinate information of a single trigger position, may send out a trigger-control signal corresponding to the trigger position. For example, when the left body 110 and the right body 120 slide relatively to the first trigger position, the controller 300 may send out a corresponding control signal, i.e., the coordinate L1 of the first trigger position corresponds to that control signal.

The controller 300, according to the coordinates of a plurality of trigger positions, may send out a trigger-control signal corresponding to the plurality of trigger positions. For example, when the left body 110 and the right body 120 slide from the first trigger position to the second trigger position, the controller 300 may send out a corresponding control signal, i.e., the change from the coordinate L1 of the first trigger position to the coordinate L2 of the second trigger position may correspond to that control signal.

The controller 300, according to a displacement that the left body 110 and the right body 120 slide relatively, may send out a trigger-control signal corresponding to the displacement. For example, when the left body 110 and the right body 120 slide from the first trigger position to the second trigger position, the displacement is M1=L2−L1, and the controller 300 may send out a corresponding control signal, i.e., the displacement M1 that the left body 110 and the right body 120 slide relatively may correspond to that control signal.

The controller 300 may control the remote controller itself according to the position signal. For example, as shown in FIG. 1, in some embodiments, the remote controller 10 may further comprise a power switch 400 configured to control a power supply of the remote controller 10. The power switch 400 may be connected in communication with the controller 300, and the controller 300 may control power-on and power-off states of the power switch 400 according to the position signal.

The controller 300 may control a remotely controlled object according to the position signal. For example, as shown in FIG. 1, in some embodiments, the remote controller 10 may further comprise a wireless signal transmitting device 500. The controller 300 may be connected in communication with the wireless signal transmitting device 500 and may transmit a control signal through the wireless transmitting device 500.

In some embodiments, the controller 300 may control the remote controller 10 itself and the remotely controlled object according to a change in the relative position of the left body 110 and the right body 120. For example, in some embodiments, the remote controller 10 may further comprise both the wireless signal transmitting device 500 and the power switch 400 for controlling the power supply of the remote controller 10. The power switch 400 may be connected in communication with the controller 300. The controller 300 may be connected in communication with the wireless signal transmitting device 500 and may transmit a control signal through the wireless signal transmitting device 500. When the left body 110 and the right body 120 slide relatively to the first trigger position, the controller 300 may control the power switch 400 to be in the power-on state to turn on the power supply of the remote controller 10. When the left body 110 and the right body 120 continue to slide relatively to the second trigger position, the controller 300 may send out a control signal for controlling the remotely controlled object through the wireless signal transmitting device 500.

When the remotely controlled object of the remote controller 10 is a UAV, the control signal may comprise at least one of the following: a signal for controlling an extension-retraction state of the undercarriage of the UAV, a signal for controlling a deformation state of the wing of the UAV, a signal for controlling an automatic return of the UAV, or a signal for controlling an automatic take-off of the UAV.

As compared with the conventional technologies, the above-described remote controller 10 may at least have the following advantages:

(1) The above-described remote controller 10 may dock the left docking portion 111 of the left body 110 and the right docking portion 121 of the right body 120 together by the connecting mechanism 130, and the left body 110 and the right body 120 may slide relatively, such that the left body 110 and the right body 120 may be pulled apart relatively, to facilitate a user to operate the above-described remote controller 10. For example, when an interval between the ends of the left body 110 and the right body 120 that are distal from each other needs to be increased, the left body 110 and the right body 120 may slide opposite to each other. When the interval between the ends of the left body 110 and the right body 120 that are distal from each other needs to be decreased, the left body 110 and the right body 120 may slide towards each other.

(2) The left body 110 and the right body 120 of the above-described remote controller 10 may slide relatively, and may serve as a controlling switch structure of the remote controller 10, thereby expanding the functions of the left body 110 and the right body 120 of the remote controller 10.

(3) The left docking portion 111 of the left body 110 and the right docking portion 121 of the right body 120 of the above-described remote controller 10 may slide synchronously, so as to allow the left body 110 and the right body 120 to extend or retract synchronously relative to a middle position therebetween, thus improving the operability of the left body 110 and the right body 120 as a controlling switch of the remote controller 10.

(4) The above-descried remote controller 10 may control itself or a remotely controlled object of the remote controller 10 through a change in the relative position of the left body 110 and the right body 120.

Based on the above-described remote controller 10, an embodiment of the present disclosure provides a method for controlling a UAV.

Referring to FIGS. 1, 2, 3, and 8, a method for controlling a UAV using the above-described remote controller 10 according to an embodiment of the present disclosure is described.

At S1, the remote controller 10 sends out a corresponding control signal when the left body 110 and the right body 120 are pulled apart to a trigger position.

In some embodiments, sliding positions that the left docking portion 111 of the left body 110 and the right docking portion 121 of the right body 120 of the remote controller 10 slide relatively may comprise a plurality of trigger positions. Different trigger positions may correspond to different control signals.

For example, the plurality of trigger positions may respectively be a first trigger position, a second trigger position, a third trigger position, and a fourth trigger position that are arranged sequentially. Intervals between ends of the left body 110 and the right body 120 that are distal from each other may be increased sequentially when changing from the first trigger position to the fourth trigger position. The sensor 200 may send out different trigger signals at the first trigger position, the second trigger position, the third trigger position, and the four trigger position, and then the controller 300 may send out different control signals according to the different trigger signals.

At S2, the UAV receives the control signal and performs a corresponding action.

In some embodiments, the UAV may perform a corresponding action after receiving the control signal sent out by the remote controller 10. The corresponding action may comprise at least one of the followings: extension-retraction of an undercarriage, deformation of a wing, automatic return, or automatic take-off.

For example, when the left body 110 and the right body 120 of the remote controller 10 slide to the first trigger position, the remote controller 10 may send out a control signal for stretching the wing. The UAV may perform an action of stretching the wing immediately after receiving the control signal for stretching the wing.

When the left body 110 and the right body 120 of the remote controller 10 slide to the second trigger position, the remote controller 10 may send out a control signal for automatic take-off. The UAV may perform an action of automatic take-off immediately after receiving the control signal for automatic take-off.

When the left body 110 and the right body 120 of the remote controller 10 slide to the third trigger position, the remote controller 10 may send out a control signal for undercarriage retraction. The UAV may perform an action of undercarriage retraction immediately after receiving the control signal for undercarriage retraction.

When the left body 110 and the right body 120 of the remote controller 10 slide to the fourth trigger position, the remote controller 10 may send out a control signal for automatic return. The UAV may perform an action of automatic return immediately after receiving the control signal for automatic return.

The above-described method for controlling a UAV may at least have the following advantages:

(1) The conventional controlling method requires a user to use some fingers to hold the remote controller 10, while using other fingers to operate operation buttons or joysticks. On the other hand, according to the above-described method for controlling the UAV, a control signal may be generated by pulling the left body 110 and the right body 120 of the remote controller 10 apart. Thus, the user, when holding the left body 110 and the right body 120 of the remote controller 10, may only need to pull the left body 110 and the right body 120 apart, and thus the difficulty of controlling the UAV may be significantly decreased.

(2) According to the above-described method for controlling the UAV, a plurality of different control signals may be generated by sliding the left body 110 and the right body 120 of the remote controller 10 to different sliding positions, to implement different functional controls of the remote controller 10 for an aircraft, thereby further improving an operation convenience of the UAV.

In the several embodiments provided by the present disclosure, it should be understood that, the disclosed related device and method may be implemented by other ways. For example, the above-described device embodiments are merely schematic. For example, the division of the modules or units is merely a logic function division, and other division manners may be employed when it is practiced actually. For example, more units or components may be combined or may be integrated into another system. In some embodiments, some features may be omitted or not be performed. Additionally, couplings or direct couplings or communication connections between one and another as displayed or discussed may be indirect couplings or communication connections via some interfaces, devices or units, or may be in electric, mechanical or other forms.

Units described as separate parts may or may not be separated physically. Components displayed as units may or may not be physical units, i.e., they may be located in one place, or may be distributed onto a plurality of network units. Some or all of the units may be selected in order to achieve the objects of the solutions of the embodiments according to the actual requirements.

Additionally, various functional units in various embodiments according to the present disclosure may be integrated into one processing unit, or may be physically individual. Two or more of various function units may be integrated into one unit. The above integrated unit may be implemented in a form of hardware or in a form of functional units of software.

The integrated units if being implemented in a form of functional units of software and being independent products for sale and use may be stored in one computer-readable storage medium. Based on such understandings, part or all of the technical solution consistent with the present disclosure may be embodied in a form of a software product. The software product may be stored in a storage medium, and comprise several instructions for causing the computer processor to execute some or all of steps of the methods in various embodiments according to the present disclosure. The above-mentioned storage medium may comprise: a USB flash disk, a movable hard disc, a Read-Only Memory (ROM), a random access memory (RAM), a diskette or an optical disc, or a medium capable of storing program codes.

The foregoing disclosure is merely illustrative of the embodiments of the disclosure, and is not intended to limit the scope of the disclosure. Any equivalent structural or flow variations made on the basis of the description and the drawings of the disclosure, and their direct or indirect application to other relevant technical fields, shall all fall into the scope of the disclosure.

What is claimed is:

1. A handle structure of a remote controller, comprising:
a left body including a left docking portion;
a right body including a right docking portion configured to be docked with the left docking portion;
a connecting mechanism connecting the left docking portion and the right docking portion and configured to allow the left body and the right body to slide relative to the connecting mechanism synchronously to adjust an interval between an end of the left body and an end of the right body that are distal from each other;
a limiting mechanism configured to define sliding positions of the left docking portion and the right docking portion; and
a guiding barrel sleeved at the left docking portion and the right docking portion.

2. The handle structure according to claim 1, wherein:
the guiding barrel includes a guiding portion arranged within the guiding barrel,
at least one of the left docking portion or the right docking portion includes a fitting portion fitted with the guiding portion and configured to non-rotatably sleeve the guiding barrel on the left docking portion and the right docking portion, and
the left docking portion and the right docking portion are configured to slide along the guiding portion.

3. The handle structure according to claim 2, wherein:
the guiding portion includes a guiding plane provided at an inner wall of the guiding barrel and extending along an axial direction of the guiding barrel, and
the fitting portion includes a fitting plane provided on the left docking portion or the right docking portion and extending along an axial direction of the left docking portion or the right docking portion; or,
wherein:
the guiding portion includes a guiding groove provided at an inner wall of the guiding barrel and extending along an axial direction of the guiding barrel, and
the fitting portion includes a fitting post provided on the left docking portion or the right docking portion and disposed perpendicular to an axial direction of the left docking portion or the right docking portion.

4. The handle structure according to claim 1, wherein the connecting mechanism is provided within the guiding barrel.

5. The handle structure according to claim 1, wherein the connecting mechanism comprises:
a left straight rack fixed on the left docking portion and disposed along a sliding direction of the left docking portion;
a right straight rack fixed on the right docking portion and disposed along a sliding direction of the right docking portion, the right straight rack and the left straight rack being disposed spaced apart from and opposite to each other; and
a circular gear disposed between the left straight rack and the right straight rack and engaging with the left straight rack and the right straight rack simultaneously.

6. The handle structure according to claim 1, wherein the connecting mechanism comprises:
a left worm fixed on the left docking portion and disposed along a sliding direction of the left docking portion;
a right worm fixed on the right docking portion and disposed along a sliding direction of the right docking portion; and
a worm wheel disposed between the left worm and the right worm and engaging with the left worm and the right worm simultaneously.

7. The handle structure according to claim 1, wherein the connecting mechanism comprises:
a left track segment fixed on the left docking portion and disposed along a sliding direction of the left docking portion;
a right track segment fixed on the right docking portion and disposed along a sliding direction of the right docking portion; and
a belt pulley disposed between the left track segment and the right track segment and engaging with the left track segment and the right track segment simultaneously.

8. The handle structure according to claim 1, wherein:
the limiting mechanism comprises two limiting portions provided respectively at inner peripheries of two open ends of the guiding barrel,
a left stop portion and a right stop portion respectively fixed at the left docking portion and the right docking portion, and
the two limiting portions are fitted respectively with the left stop portion and the right stop portion to define respectively sliding positions of the left docking portion and the right docking portion within the guiding barrel.

9. The handle structure according to claim 8, wherein:
the left stop portion includes a left stop boss provided at a periphery of a free end of the left docking portion and extending along a circumferential direction of the left docking portion,
the right stop portion includes a right stop boss provided at a periphery of a free end of the right docking portion and extending along a circumferential direction of the right docking portion,
each of the limiting portions includes a limiting convex rib provided at an inner surface of the guiding barrel and extending along a circumferential direction of the guiding barrel, and
the left stop boss and the right stop boss are configured to respectively abut against the two limiting convex ribs, to prevent the left docking portion and the right docking portion from releasing from the guiding barrel.

10. The handle structure according to claim 9, wherein:
the left stop portion includes a left stop groove provided on a periphery of a free end of the left docking portion and extending along an axial direction parallel to the left docking portion,
the right stop portion includes a right stop groove provided on a periphery of a free end of the right docking portion and extending along an axial direction parallel to the right docking portion,
each of the limiting portions includes a limiting post provided at an inner surface of the guiding barrel and disposed perpendicular to an axial direction of the guiding barrel, and
one of the limiting posts is configured to slide within the left stop groove along an extending direction of the left stop groove and limited by side walls of two ends of the left stop groove, and another one of the limiting posts is configured to slide within the right stop groove along an extending direction of the right stop groove and limited by side walls of two ends of the right stop groove.

11. The handle structure according to claim 1, wherein the guiding barrel comprises a first guiding cover and a second guiding cover that are connected detachably to each other and jointly form the guiding barrel.

12. The handle structure according to claim 11, wherein:
a hook is provided at an edge of the first guiding cover that is connected with the second guiding cover, and
a snap is provided at an edge of the second guiding cover that is connected with the first guiding cover and is configured to snap with the hook; or,
wherein:
a sliding groove is provided at an edge of the first guiding cover that is connected with the second guiding cover, one end of the sliding groove being an open end and another end of the sliding groove being a closed end,
a sliding rail is provided at an edge of the second guiding cover that is connected with the first guiding cover, and
the sliding rail is configured to slide into the sliding groove from the open end of the sliding groove and snap with the sliding groove; or,
wherein:
a first notch is provided at an edge of the first guiding cover that is connected with the second guiding cover,
a second notch is provided at an edge of the second guiding cover that is connected with the first guiding cover, and
the first notch and the second notch are disposed opposite to each other and jointly form a wiring hole for a wire to be inserted.

13. The handle structure according to claim 1, wherein:
the left body includes a first fitting surface extending along a sliding direction of the left body,
the right body includes a second fitting surface extending along a sliding direction of the right body,
the first fitting surface and the second fitting surface are disposed opposite to each other,
the limiting mechanism comprises a sliding portion provided on the first fitting surface and a sliding limiting portion provided on the second fitting surface, and
the sliding portion and the sliding limiting portion are configured to limit sliding positions of the left docking portion and the right docking portion.

14. The handle structure according to claim 13, wherein:
the sliding portion includes a sliding block provided on the first fitting surface and including a sliding groove,
the sliding limiting portion includes a lead rail provided on the second fitting surface and extending along a sliding direction that the left docking portion and the right docking portion slide relatively, each of two ends of the lead rail including a stop end, and
the lead rail is configured to fit with the sliding groove to allow the sliding block to slide along the lead rail and be limited by the stop ends of two ends of the lead rail; or
wherein:
the sliding portion includes a sliding block provided on the first fitting surface,
the sliding limiting portion includes a guiding groove provided on the second fitting surface and extending along a sliding direction that the left docking portion and the right docking portion slide relatively, and
the sliding block is configured to slide within the guiding groove along an extending direction of the guiding groove, and be limited by side walls of two ends of the guiding groove; or
wherein:
the sliding portion includes a pillar provided on the first fitting surface,
the sliding limiting portion includes a guiding hole provided on the second fitting surface and penetrating through the right docking portion, the guiding hole extending along a sliding direction that the left docking portion and the right docking portion slide relatively, and
the pillar is configured to slide within the guiding hole and be limited by side walls of two ends of the guiding hole.

15. The handle structure according to claim 1, wherein:
each of the left body and the right body includes an L-shaped structure, and the left body and the right body jointly form a U-shaped structure,
the left docking portion is provided at one end of the left body, and the right docking portion is provided at one end of the right body, and
a sliding direction that the left docking portion and the right docking portion slide relatively is parallel to a bottom of the U-shaped structure.

16. The handle structure according to claim 15, wherein:
a controlling button is provided at each of end surfaces of an end of the left body distal from the left docking portion and an end of the right body distal from the right docking portion, or
a controlling press rod is provided at each of peripheries of an end of the left body distal from the left docking portion and an end of the right body distal from the right docking portion.

17. The handle structure according to claim 15, wherein:
each of the left docking portion and the right docking portion includes a barrel structure, and the connecting mechanism is configured to be received within the left docking portion and the right docking portion, or
each of the left docking portion and the right docking portion includes a half cylindrical structure, and the left docking portion and the right docking portion are configured to jointly form a complete cylindrical structure.

18. The handle structure according to claim 1, further comprising:
a hand feel controlling mechanism configured to prompt a sliding distance that the left docking portion and the right docking portion slide relatively.

19. The handle structure according to claim 18, wherein:
the hand feel controlling mechanism comprises:
a carrying member provided on at least one of the left docking portion or the right docking portion and including a plurality of blocking portions disposed spaced apart from each other, the plurality of blocking portions being arranged along a straight line parallel to a sliding direction that the left docking portion and the right docking portion slide relatively; and
an elastic component provided on an inner wall of the guiding barrel and selectively abutting against one of the plurality of blocking portions, the elastic component being configured to deform elastically and move over an abutted blocking portion when the left docking portion and the right docking portion slide relatively, thereby providing a sense of damping; or the hand feel controlling mechanism comprises:
- a carrying member provided on one of the left docking portion and the right docking portion and including a plurality of blocking portions disposed spaced apart from each other, the plurality of blocking portions being arranged along a straight line parallel to a sliding direction that the left docking portion and the right docking portion slide relatively; and
- an elastic component provided on another one of the left docking portion and the right docking portion and selectively abutting against one of the plurality of blocking portions, the elastic component being configured to deform elastically and move over an abutted blocking portion when the left docking portion and the right docking portion slide relatively, thereby providing a sense of damping.

20. A handle structure of a remote controller, comprising:
a left body including a left docking portion;
a right body including a right docking portion configured to be docked with the left docking portion; and
a connecting mechanism connecting the left docking portion and the right docking portion and configured to allow the left body and the right body to slide relative to the connecting mechanism synchronously to adjust an interval between an end of the left body and an end of the right body that are distal from each other, the connecting mechanism including:
- a left straight rack fixed on the left docking portion and disposed along a sliding direction of the left docking portion;
- a right straight rack fixed on the right docking portion and disposed along a sliding direction of the right docking portion, the right straight rack and the left straight rack being disposed spaced apart from and opposite to each other; and
- a circular gear disposed between the left straight rack and the right straight rack and engaging with the left straight rack and the right straight rack simultaneously.

* * * * *